United States Patent
Pai

(10) Patent No.: US 10,820,230 B2
(45) Date of Patent: Oct. 27, 2020

(54) DEVICE, SYSTEM AND METHOD FOR DETERMINING AND PROVIDING BEARER INDICATIONS FOR A GROUP COMMUNICATION SESSION

(71) Applicant: MOTOROLA SOLUTIONS, INC., Chicago, IL (US)

(72) Inventor: Madhusudan K. Pai, Palatine, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 58 days.

(21) Appl. No.: 16/103,185

(22) Filed: Aug. 14, 2018

(65) Prior Publication Data

US 2020/0059816 A1 Feb. 20, 2020

(51) Int. Cl.
| | |
|---|---|
| *H04W 4/00* | (2018.01) |
| *H04W 28/02* | (2009.01) |
| *H04W 72/00* | (2009.01) |
| *H04L 12/14* | (2006.01) |
| *H04L 12/18* | (2006.01) |

(52) U.S. Cl.
CPC ..... *H04W 28/0257* (2013.01); *H04L 12/1407* (2013.01); *H04L 12/185* (2013.01); *H04L 12/1886* (2013.01); *H04W 72/005* (2013.01)

(58) Field of Classification Search
None
See application file for complete search history.

(56) References Cited

U.S. PATENT DOCUMENTS

| 9,173,073 | B2 | 10/2015 | Marocchi et al. |
| 9,763,130 | B1* | 9/2017 | Singh ................ H04W 28/0205 |
| 2009/0316656 | A1* | 12/2009 | Zhao ..................... H04W 28/22 370/331 |
| 2010/0182912 | A1 | 7/2010 | Hongisto et al. |
| 2011/0040836 | A1* | 2/2011 | Allen .................. H04L 65/1093 709/205 |
| 2012/0302240 | A1* | 11/2012 | Tamaki ............. H04W 36/0011 455/436 |
| 2013/0136036 | A1 | 5/2013 | Chen et al. |

(Continued)

FOREIGN PATENT DOCUMENTS

WO WO-2014036341 A2 3/2014

OTHER PUBLICATIONS

UKIPO, Search Report under Section 17, dated Jan. 20, 2020 re U.K. Patent Application No. 1911491.7.

*Primary Examiner* — Zewdu A Beyen
(74) *Attorney, Agent, or Firm* — Perry + Currier, Inc.

(57) ABSTRACT

A device, system and method for determining and providing bearer indications for a group communication session is provided. A server for managing a group communication session determines active communication devices of the group communication session. The server determines bearer indications for the active communication devices, the bearer indications indicating: whether a respective bearer of an active communication device is a unicast bearer or a multicast bearer; and whether the respective bearer has a guaranteed bit rate or no guaranteed bit rate. The server transmits, to each of the active communication devices, the bearer indications to cause each of the active communication devices to provide, at a respective notification device, a notification of the bearer indications.

20 Claims, 9 Drawing Sheets

(56) References Cited

U.S. PATENT DOCUMENTS

2013/0301558 A1* 11/2013 Zakrzewski ...... H04W 28/0215
  370/329
2014/0120973 A1    5/2014 Agulnik et al.
2014/0307618 A1* 10/2014 Kim ................ H04W 4/70
  370/312
2014/0355508 A1   12/2014 Anchan et al.
2019/0261225 A1*  8/2019 Eswarakava ........ H04W 24/02

* cited by examiner

DEVICE, SYSTEM AND METHOD FOR DETERMINING AND PROVIDING BEARER INDICATIONS FOR A GROUP COMMUNICATION SESSION

BACKGROUND OF THE INVENTION

Group communications between devices generally occur using bearers and/or pipes in a network. However, when a bearer for a device is lost and/or a bearer for a device changes, for example due to network congestion, the device may not receive critical communications in a timely fashion; in emergency situations such loss and/or change in a bearer may critically affect whether information is conveyed in a timely fashion to the device where the bearer is lost and/or changes.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
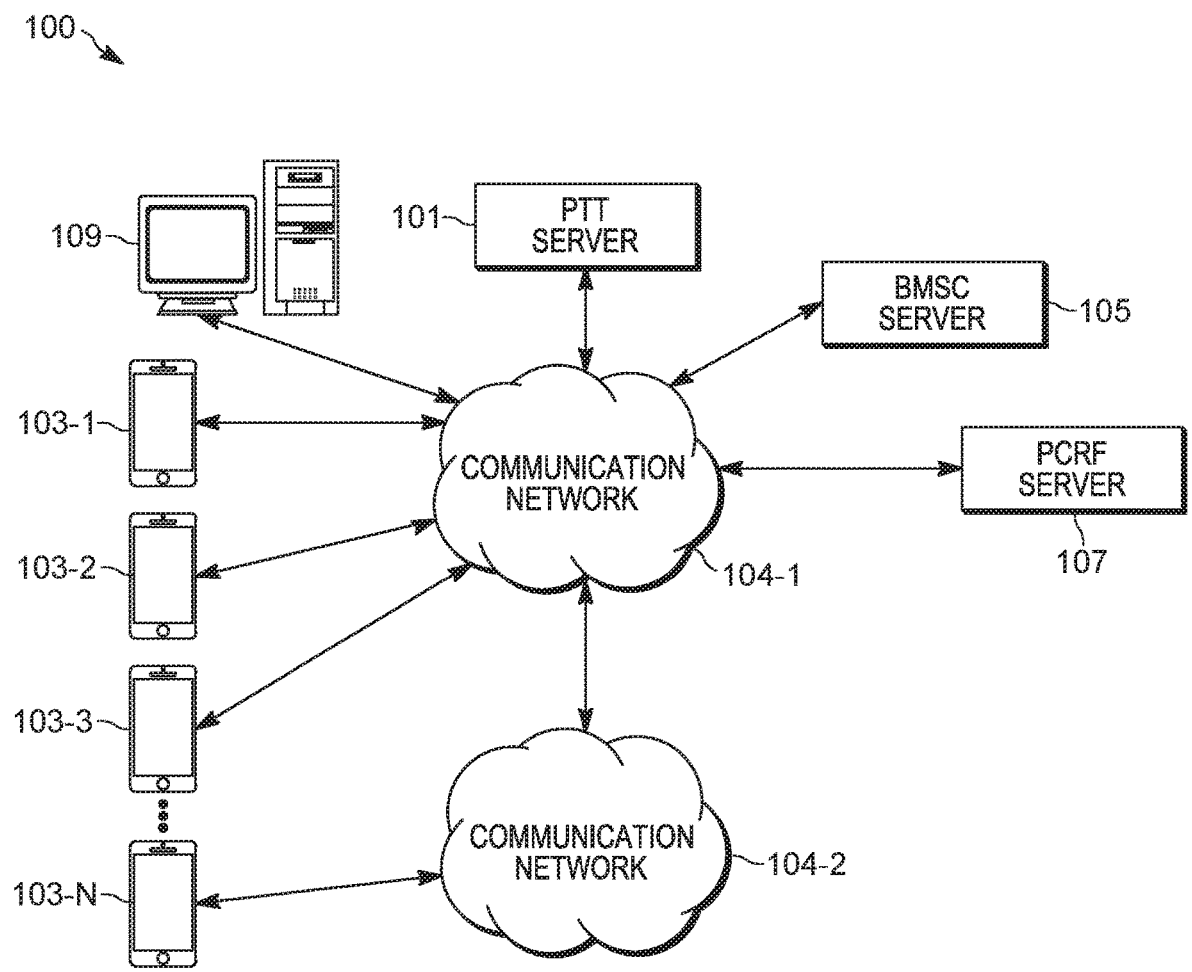
FIG. 1 depicts a system for determining and providing bearer indications for a group communication session in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the present specification provides a method comprising: determining, using a server for managing a group communication session, active communication devices of the group communication session; determining, at the server, bearer indications for the active communication devices, the bearer indications indicating: whether a respective bearer of an active communication device is a unicast bearer or a multicast bearer; and whether the respective bearer has a guaranteed bit rate or no guaranteed bit rate; and transmitting, from the server, to each of the active communication devices, the bearer indications to cause each of the active communication devices to provide, at a respective notification device, a notification of the bearer indications.

Another aspect of the present specification provides a server comprising: a communication unit configured to communicate with active communication devices of a group communication session; and a controller communicatively coupled to the communication unit, the controller configured to: determine the active communication devices of the group communication session; determine bearer indications for the active communication devices, the bearer indications indicating: whether a respective bearer of an active communication device is a unicast bearer or a multicast bearer; and whether the respective bearer has a guaranteed bit rate or no guaranteed bit rate; and transmit, using the communication unit, to each of the active communication devices, the bearer indications to cause each of the active communication devices to provide, at a respective notification device, a notification of the bearer indications.

FIG. 1 illustrates an example system 100 for determining and providing bearer indications for a group communication session in accordance with some examples. As depicted, the system 100 comprises a server 101 configured to manage a group communication session for a plurality of communication devices 103-1, 103-2, 103-3 . . . 103-N, interchangeably referred to hereafter, collectively, as the communication devices 103 and, generically, as a communication device 103. Each of the communication devices 103 may comprise a portable communication device, and the like. As depicted, the server 101 is a push-to-talk (PTT) server, however the server 101 may be any server that is configured to determine and provide bearer indications for a group communication session, which may include managing and/or facilitating the group communication session.

Initially the communication devices 103 are not in a group communication session but are configured to communicate with the server 101 via at least one communication network 104-1, 104-2 (interchangeably referred to hereafter, collectively, as the networks 104 and, generically, as a network 104), as well as communication links therebetween. Such communication links may be wireless and/or wired communication links, and are depicted in FIG. 1 as arrows between components of the system 100. As depicted, three communication devices 103-1, 103-2, 103-3 are communicating via the network 104-1, while one communication device 103-N is communicating via the network 104-2; for example, the communication device 103-N may not be in area of coverage of the network 104-1 and/or may not be enabled to communicate via the network 104-1.

Furthermore, while four communication devices 103, and two networks 104, are depicted, the system 100 may comprise as few as two communication devices 103, such that processes described herein may also be applied to one-to-one and/or private calls, and as few as one network 104. In general, the system 100 may comprise any suitable number "N" of communication devices 103, and networks 104. Furthermore, in examples described herein, each of the communication devices 103 may comprise a PTT talk communication device operated by a respective first responder, and the like, though any type of communication device that may participate in a group communication session, and operated by any type of user, is within the scope of the present specification.

Such group communication sessions may include, but are not limited to, group communication sessions initiated via PTT functionality at the communication devices 103 and which may include, but are not limited to, talkgroup communication sessions. Such group communication sessions generally include an exchange of audio between two or more of the communication devices 103 and may further include an exchange of video between two or more of the communication devices 103. Indeed, subsets of identifiers of the communication devices 103 may be stored in association with respective talkgroup identifiers, and the like, which may be stored at the server 101 and/or stored in a memory accessible to the server 101; such talkgroup identifiers may be transmitted by a communication device 103, to the server 101, to initiate a group communication session with the communication devices 103 identified by the talkgroup identifier.

Furthermore, each of the communication devices 103 may periodically transmit data to the server 101 indicating a location thereof (e.g. using a respective location determining device), and/or an identifier of a network 104 over which a communication device 103 is communicating and/or a multi cast service area in which multicast bearers are available, as described in further detail below; the identifier of the network 104 may include an identifier of a carrier and/or PLMN (public-land mobile network) and the like that a communication device 103 is using to communicate over the network 104.

The network 104-1 may comprise one or PLMNs, such as one or more LTE (Long Term Evolution) networks, and the like, in which unicast and multicast bearers may be established for a group communication session. Indeed, the network 104-1 may comprise more one PLMN and/or LTE network, and the like, for example PLMNs and/or LTE networks operated by different carriers.

Furthermore, in the network 104-1, when multicast bearers are established, such multicast bearers are generally provided with a guaranteed bit rate (GBR), while unicast bearers may or may not be provided with a GBR. However, the network 104-1 comprises any suitable network over which unicast and/or multicast bearers may be established for a group communication session with or without GBR.

While in present examples, the network 104-1 is described as an LTE network, the network 104-1 may comprise a long-term evolution advanced (LTE-A) network, a Universal Mobile Telecommunications System (UMTS), a code-division multiple access (CDMA) network, a microwave network, a millimeter wave network, a Project "25" network, a terrestrial trunked radio (TETRA) network, a land mobile radio (LMR) network, a satellite network, and the like.

The network 104-2 may comprise a non-PLMN network and/or a non-LTE network over which only unicast bearers without GBR may be established for a group communication session including, but not limited to, a WiFi network, a Worldwide Interoperability for Microwave Access (Wi-MAX) network, a Bluetooth™ based network, and the like, and/or cell phone networks without available GBR for any unicast bearers, such as a Global System for Mobile communications (GSM) network, a high-speed packet access (HSPA) network, and the like.

Hence, the networks 104 may be of different types and, as depicted, the networks 104 are in communication with each other via one or more communication links, which may include any suitable components for communicating between the different network types.

As depicted, the system 100 further comprises a BMSC (Broadcast Multicast Service Center) server 105 and a PCRF (Policy and Charging Rules Function) server 107.

In general, the server 101 communicates with the BMSC server 105 to establish one or more multicast bearers with GBR for active communication devices 103 in a group communication session, for example in an LTE network and/or any suitable PLMN. In particular, the BMSC server 105 may establish one or more LTE multicast GBR bearers for one or more communication devices 103 including, but not limited to, an LTE eMBMS (Evolved Multimedia Broadcast Multicast Services) GBR bearer, an LTE SC-PTM (Single-Cell Point-To-Multipoint) GBR bearer and the like. While only one BMSC server 105 is depicted, the system 100 may include more than one BMSC server, for example a BMSC server for each carrier and/or PLMN being used by the communication devices 103.

Similarly, the server 101 communicates with the PCRF server 107 to establish one or more unicast bearers (with or without GBR) for the active communication devices 103 in the group communication session, for example in an LTE network and/or any suitable PLMN. The type of unicast bearer provided for a communication device 103 may depend on attributes such as priority of the communication (which may be communicated to the PCRF server 107 by the server 101) and available bandwidth in a network, and some communication devices 103 may be provided with a unicast bearer with GBR, while other communication devices 103 may be provided with a unicast bearer with no GBR (e.g. a default bearer). While only one PCRF server 107 is depicted, the system 100 may include more than one PCRF server 107, for example a PCRF server 107 for each carrier and/or "home" PLMN server (e.g. when a communication device 103 is not roaming) or "visited" PLMN server (e.g. when a communication device 103 is roaming) being used by the communication devices 103.

However, any suitable types of servers for setting up unicast and/or multicast bearers in one or more PLMNs is within the scope of the present specification.

In some examples, the server 101 first communicates with the BMSC server 105 to attempt to establish one or more LTE eMBMS GBR bearers for the active communication devices 103 in the group communication session and, when not all the active communication devices 103 are in an area of coverage for an LTE eMBMS GBR bearer, the server 101 may than communicate with the PCRF server 107 to establish LTE unicast bearers for the remaining active communication devices 103, the LTE unicast bearers having a GBR when available, or no GBR when GBR is not available, for example due to network congestion.

When one or more of the active communication devices 103 are not in an area of coverage for an LTE eMBMS GBR bearer or an LTE unicast bearer and/or may not be enabled to communicate via an LTE eMBMS GBR bearer or an LTE unicast bearer, and the like (e.g. the communication device 103-N), the server 101 may communicate with the one or more of the active communication devices 103 that are not in such areas of coverage to establish a non-LTE unicast non-GBR bearer, for example via WiFi network and the like. However, the server 101 may establish bearers for a group communication session in any suitable manner.

In general, a communication device 103 may alternatively be referred to as an active communication device 103 in a given group communication session when the communication device 103 has requested to participate and/or is participating in the given active communication session. For example, two or more of the communication devices 103 may be on an LTE network, such as the network 104-1, and request to communicate via PTT, and the like; the group communication may then occur via the LTE network and the two or more of the communication devices 103 may be referred to as active communication devices 103 of a given active communication session while the remaining communication devices 103 are not active for the given active communication session. However, such active communications devices 103 may be participating in the active communication session on different networks 104 or the same network 104.

As depicted, the system 100 further includes a console device 109, which may be located at a dispatch center, and the like, and operated by a dispatcher, and the like. Hence, the console device 109 may comprise a dispatch console device, and may be configured to dispatch users of the communication devices 103 to incidents and the like. The console device 109 may also be a participant in a group communication session with the communication devices 103; hence the console device 109 may also be an active communication device in a given group communication session. Regardless, the console device 109 may monitor group communication sessions in which the communication devices 103 are participating, for example by receiving indications from the server 101 that indicate which communications devices 103 are participating in group communication sessions. Hence, there may be more than one group communication session occurring between the communication devices 103 at any given time in the system 100, and the console device 109 may be provided with indications of a plurality of the group communication sessions. Such indications may be used for network planning; for example such indications may enable a determination of where the communications devices 103 are generally historically located, when bearers are dropped, and the like, which may be used to identify geographical areas where network coverage may be improved, for example by erecting more network equipment, such as antennas and the like.

Communications between the server 101 and the communications devices 103, as well as the console device 109, may occur by one or more of: SIP (Session Initiation Protocol) messaging; a SIP SUBSCRIBE/NOTIFY package; HTTP (HyperText Transmission Protocol) messaging; RTP (Real-time Transport Protocol) control blocks; and RTCP (RTP Control Protocol) messaging. However, any suitable communication protocol may be used for such communications.

Figure 2:
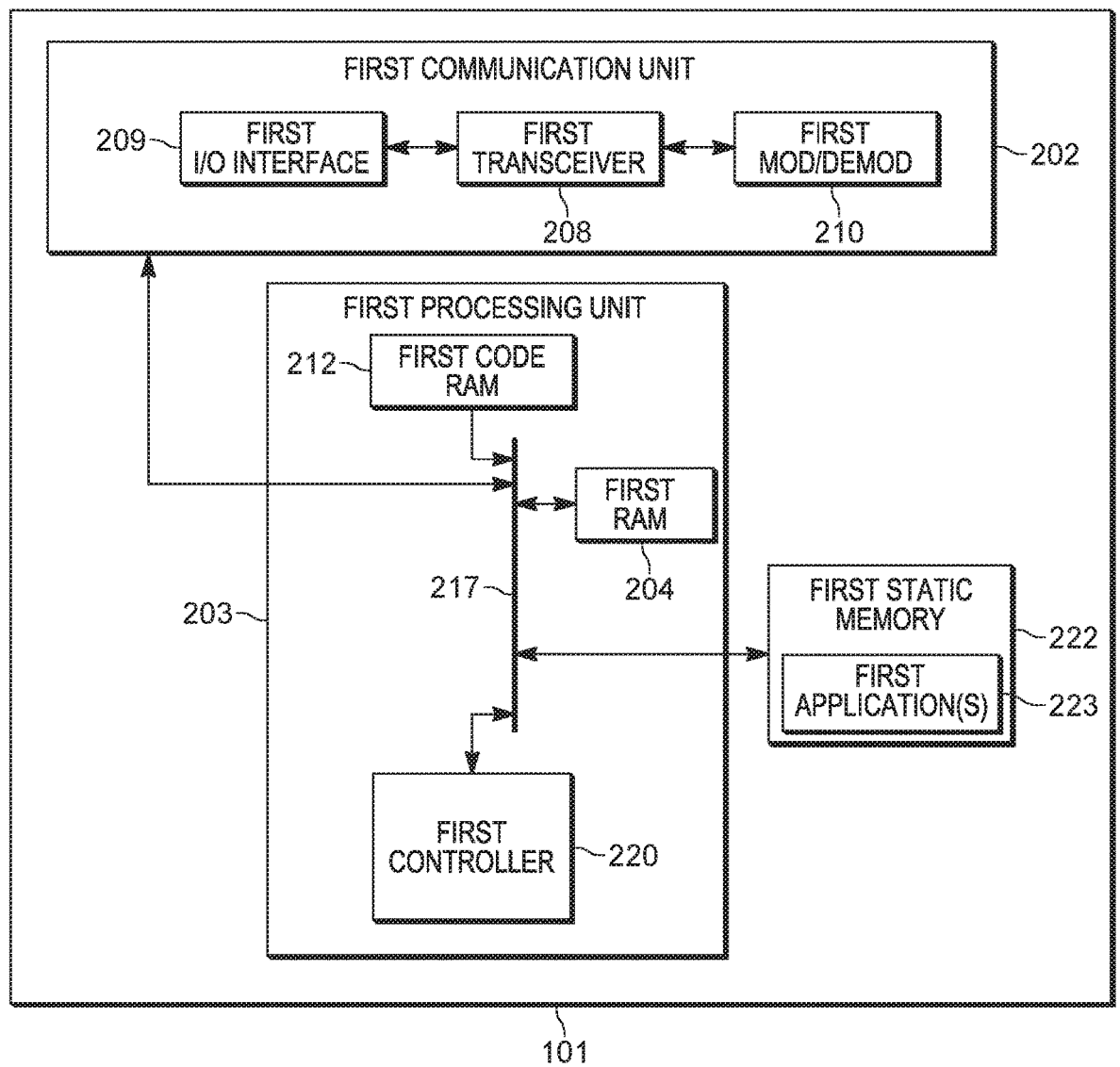
FIG. 2 depicts a device for determining and providing bearer indications for a group communication session in accordance with some examples.

Attention is next directed to FIG. 2 which sets forth a schematic diagram of the example server 101. While the system 100 depicts only one server 101, the system 100 may comprise a plurality of servers, and the functionality of the server 101 may be distributed among such a plurality of servers, and the like.

As depicted in FIG. 2, the example server 101 generally includes a first communications unit 202, a first processing unit 203, a first Random-Access Memory (RAM) 204, one or more first wireless transceivers 208, one or more first wired and/or wireless input/output (I/O) interfaces 209, a first combined modulator/demodulator 210, a first code Read Only Memory (ROM) 212, a first common data and first address bus 217, a first controller 220, and a first static memory 222 storing at least one first application 223. Hereafter, the at least one application 223 will be interchangeably referred to as the application 223. Furthermore, each of the memories 212, 222 comprise non-transitory memories and/or non-transitory computer readable mediums.

The server 101 is described hereafter in further detail.

As shown in FIG. 2, the server 101 includes the communications unit 202 coupled to the common data and address bus 217 of the processing unit 203. While not depicted, the server 101 may also include one or more input devices (e.g., keypad, pointing device, touch-sensitive surface, etc.) and a display screen (which, in some embodiments, may be a touch screen and thus also act as an input device), each coupled to be in communication with the processing unit 203. The server 101 may also include one or more of speaker and a microphone used for interactions with the server 101.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory (RAM) 204 and a static memory 222.

The communications unit 202 may include one or more wired and/or wireless input/output (I/O) interfaces 209 that are configurable to communicate with other communication devices.

For example, the communication unit 202 may include one or more transceivers 208 and/or wireless transceivers for communicating with the communication devices 103, the servers 105, 107 and the console device 109, via the networks 104. The one or more transceivers 208 may include, but are not limited to, an LTE transceiver, a digital mobile radio (DMR) transceiver, a Project 25 (P25) transceiver, a terrestrial trunked radio (TETRA) transceiver, a Bluetooth transceiver, a Wi-Fi transceiver, for example operating in accordance with an IEEE 802.11 standard (e.g., 802.11a, 802.11b, 802.11g), a Worldwide Interoperability for Microwave Access (WiMAX) transceiver, for example operating in accordance with an IEEE 802.16 standard, and/or another similar type of wireless transceiver configurable to communicate via a wireless radio network.

The communications unit 202 may optionally include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components (e.g. a display screen, an input device, a speaker and/or a microphone, and the like).

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the server 101 is not a generic controller and/or a generic device, but a device specifically configured to implement functionality for determining and providing bearer indications for a group communication session. For example, in some examples, the server 101 and/or the controller 220 specifically comprises a computer executable engine configured to implement functionality for determining and providing bearer indications for a group communication session.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the server 101 as described herein are maintained, persistently, at the memory 222 and used by the controller 220 which makes appropriate utilization of volatile storage during the execution of such programming instructions.

In particular, the memory 222 stores instructions corresponding to the at least one application 223 that, when executed by the controller 220, enables the controller 220 to implement functionality for determining and providing bearer indications for a group communication session. In illustrated examples, when the controller 220 executes the one or more applications 223, the controller 220 is enabled to: determine active communication devices 103 of a group communication session; determine bearer indications for the active communication devices 103, the bearer indications indicating: whether a respective bearer of an active communication device 103 is a unicast bearer or a multicast bearer; and whether the respective bearer has a guaranteed bit rate or no guaranteed bit rate; and transmit, using the communication unit 202, to each of the active communication devices 103, the bearer indications to cause each of the active communication devices 103 to provide, at a respective notification device, a notification of the bearer indications.

Figure 3:
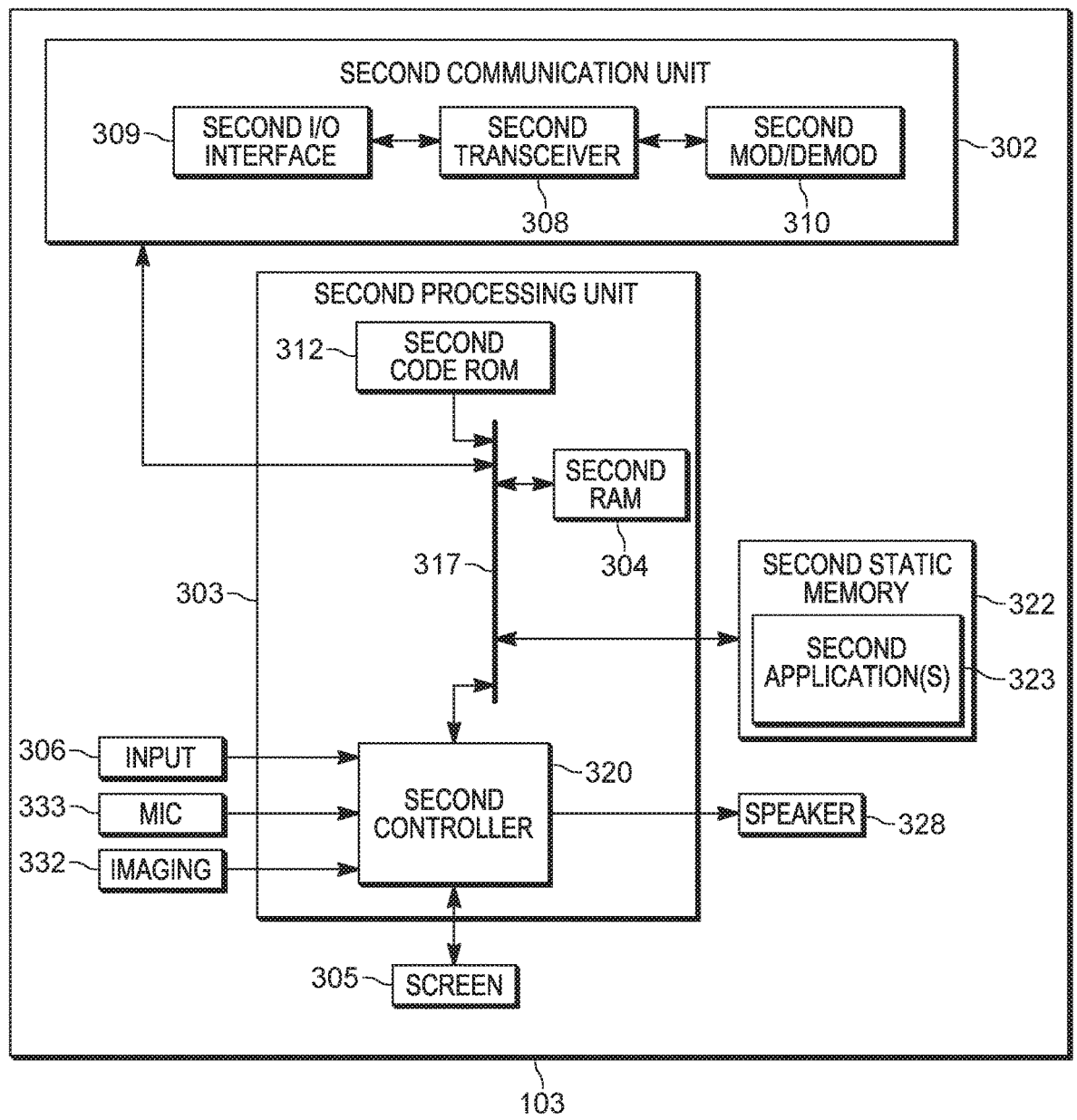
FIG. 3 depicts a device for receiving and providing bearer indications for a group communication session in accordance with some examples

Attention is next directed to FIG. 3 which sets forth a schematic diagram that illustrates an example communication device 103. The console device 109 may have a similar structure as the example communication device 103 of FIG. 3, adapted, however, to the functionality and/or the environment of a console device. The example communication devices 103 may be, for example, two-way radios, smart telephones, tablet computers, laptop computers, vehicle-mounted radios, drone-mounted radios, modems, relays, and the like. In one example, the communication devices 103 may be LTE User Equipment (UE) devices. However, the example communication device 103 may be any device configured to receive and provide bearer indications for a group communication session, for example at a notification device.

As depicted in FIG. 3, the example communication device 103 generally includes a second communications unit 302, a second processing unit 303, a second Random-Access Memory (RAM) 304, a display screen 305, an input device 306, one or more second wireless transceivers 308, one or more second wired and/or wireless input/output (I/O) interfaces 309, a second combined modulator/demodulator 310, a second code Read Only Memory (ROM) 312, a second common data and address bus 317, a second controller 320, a second static memory 322 storing at least one second application 323 (interchangeably referred to hereafter as the application 323), a speaker 328, an imaging device 332 and a microphone 333. Furthermore, each of the memories 312, 322 comprise non-transitory memories and/or non-transitory computer readable mediums.

However, while the example communication device 103 is described with respect to including certain components, it is understood that the example communication device 103 may be configured according to the functionality of a specific device. For example, one or more of the imaging device 332, the microphone 333 and/or other media components associated with the example communication device 103 may be external to the example communication device 103 and communicatively coupled thereto.

As another example, the example communication device 103 may further include a location determination device (for example, a global positioning system (GPS) receiver) and the like, and the example communication device 103 may determine its location using such a location determination device and periodically report the location to the server 101. Other combinations are possible as well.

The example communication device 103 is described hereafter in further detail. In general, the example communication device 103 is configured to participate in a group communication session by exchanging audio, and optionally video, with other communication devices 103 in the group communication session. Furthermore, the example communication device 103 generally includes at least one notification device for providing bearer indications for a group communication session, for example as received from the server 101.

As shown in FIG. 3, the example communication device 103 includes the communications unit 302 coupled to the common data and address bus 317 of the processing unit 303. The example communication device 103 may also include one or more input devices 306 (e.g., keypad, pointing device, touch-sensitive surface, etc.) and the display screen 305 (which, in some examples, may be a touch screen and thus also act as an input device 306), each coupled to be in communication with the processing unit 303.

The speaker 328 may be present for reproducing audio that is decoded from voice or audio streams of calls received via the communications unit 302 from other communication devices 103, for example in a group communication session. The speaker 328 may also comprise a notification device for providing bearer indications, for example in an audio format, for a group communication session.

The microphone 333 may be present for capturing audio from a user (not depicted) that is further processed by the processing unit 303 and/or is transmitted as voice or audio data by the communications unit 302 to other communication devices 103, for example in a group communication session.

Hence, the combination of the speaker 328 and the microphone 333 may enable the example communication device 103 to communicate in group communication sessions via audio and/or voice communications, channels and/or talkgroups, and the like.

The display screen 305 may comprise any suitable display screen including, but not limited to, a flat panel display screen, and the like, and which may be used to provide video in a group communication session. The display screen 305 may also comprise a notification device for providing bearer indications, for example in a visual audio format, for a group communication session.

The imaging device 332 may provide video (still or moving images) of an area in a field of view of the example communication device 103 for further processing by the processing unit 303 and/or for further transmission by the communications unit 302 and which may also be used in communications in a group communication session.

Hence, the combination of the display screen 305 and the imaging device 332 (along with the combination of the speaker 328 and the microphone 333) may enable the example communication device 103 to communicate in group communication sessions via video communications, channels and/or talkgroups, and the like.

However, the example communication device 103 may include other types of notification devices including, but not limited to, a haptic notification device, such as a vibratory motor, and the like.

The processing unit 303 may include the code Read Only Memory (ROM) 312 coupled to the common data and address bus 317 for storing data for initializing system components. The processing unit 303 may further include the controller 320 coupled, by the common data and address bus 317, to the Random-Access Memory (RAM) 304 and a static memory 322.

The communications unit 302 may include one or more wired and/or wireless input/output (I/O) interfaces 309 that are configurable to communicate with the other communication devices 103 in a group communication session.

For example, the communications unit 302 may include one or more wireless transceivers 308, such as a digital mobile radio (DMR) transceiver, a Project 25 (P25) transceiver, a TETRA transceiver, a Bluetooth transceiver, a Wi-Fi transceiver, for example operating in accordance with an IEEE 802.11 standard (e.g., 802.11a, 802.11b, 802.11g), an LTE transceiver, a WiMAX transceiver, for example operating in accordance with an IEEE 802.16 standard, and/or another similar type of wireless transceiver configurable to communicate via a wireless radio network.

The communications unit 302 may additionally or alternatively include one or more wireline transceivers 308, such as an Ethernet transceiver, a USB transceiver, or similar transceiver configurable to communicate via a twisted pair wire, a coaxial cable, a fiber-optic link, or a similar physical connection to a wireline network. The transceiver 308 is also coupled to a combined modulator/demodulator 310. However, as described herein, the communication devices 103 are configured to communicate wirelessly. However, the console device 109 may be configured to communicate in a wired manner.

The controller 320 may include ports (e.g. hardware ports) for coupling to the display screen 305, the input device 306, the imaging device 332, the speaker 328 and/or the microphone 333.

The controller 320 includes one or more logic circuits, one or more processors, one or more microprocessors, one or more ASIC (application-specific integrated circuits) and one or more FPGA (field-programmable gate arrays), and/or another electronic device. In some examples, the controller 320 and/or the example communication device 103 is not a generic controller and/or a generic device, but a device specifically configured to implement functionality for providing bearer indications for a group communication session, as well as for communicating in a group communication session. For example, in some examples, the example communication device 103 and/or the controller 320 specifically comprises a computer executable engine configured to implement functionality for providing bearer indications for a group communication session, as well as for communicating in a group communication session.

The static memory 322 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 3, programming instructions (e.g., machine readable instructions) that implement the functional teachings of the example communication device 103 as described herein are maintained, persistently, at the memory 322 and used by the controller 320 which makes appropriate utilization of volatile storage during the execution of such programming instructions.

In particular, the memory 322 stores instructions corresponding to the application 323 that, when executed by the controller 320, enables the controller 320 to implement functionality for providing bearer indications for a group communication session, as well as for communicating in a group communication session. In illustrated examples, when the controller 320 executes the application 323, the controller 320 is enabled to: communicate, via the communication until 302, with the server 101, to establish communication in a group communication session; receive, from the server 101, bearer indications for the group communication session; and control a notification device (such as the display screen 305 and/or the speaker 328) to provide the bearer indications for the group communication session.

Figure 4:
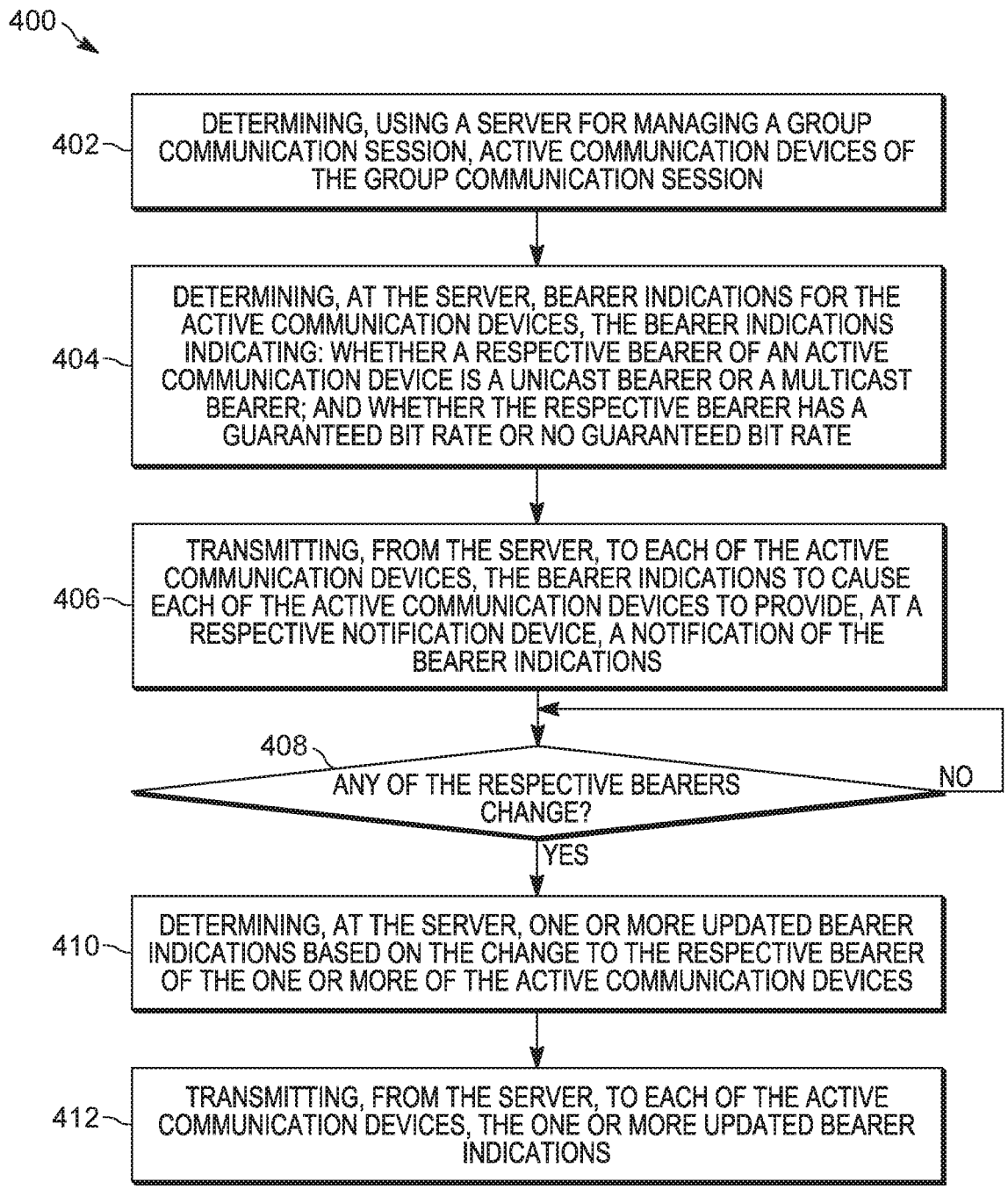
FIG. 4 depicts a flowchart of a method for determining and providing bearer indications for a group communication session in accordance with some examples.

Attention is now directed to FIG. 4 which depicts a flowchart representative of a method 400 for determining and providing bearer indications for a group communication session. The operations of the method 400 of FIG. 4 correspond to machine readable instructions that are executed by, for example, the example server 101 of FIG. 2, and specifically by the controller 220 of the example server 101 of FIG. 2. In the illustrated example, the instructions represented by the blocks of FIG. 4 are stored at the memory 222 for example, as the application 223. The method 400 of FIG. 4 is one way in which the controller 220 and/or the server 101 and/or the system 100 is configured. Furthermore, the following discussion of the method 400 of FIG. 4 will lead to a further understanding of the system 100, and its various components. However, it is to be understood that the method 400 and/or the system 100 may be varied, and need not work exactly as discussed herein in conjunction with each other, and that such variations are within the scope of present examples.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 100 of FIG. 1, as well.

At a block 402, the controller 220 determines active communication devices 103 of a group communication session. For example, the controller 220 may receive a request to participate and/or initiate a group communication session from one or more of the communication devices 103. Such requests may include a talkgroup identifier, and the like, associated with identifiers of each of the communication devices 103 in the talkgroup, such as phone numbers, network identifiers, and the like. The controller 220 may then communicate with one or more of the servers 105, 107 to establish the group communication session between the communication devices 103 of the talkgroup using, for example one or more LTE multicast bearers with GBR, one or more LTE unicast bearers with GBR, and/or one or more LTE non-GBR unicast bearers (e.g. a unicast bearer without GBR). Alternatively, when a communication device 103 is not in communication with a PLMN, such as the communication device 103-N, the server 101 may determine that such a communication device 103 is to participate in the group communication session between the communication devices 103 using a non-LTE unicast non-GBR bearer.

The server 101 may first communicate with the BMSC server 105 to attempt to establish one or more one or more LTE multicast bearers with GBR (e.g. eMBMS bearers) for at least a subset of the active communication devices 103 that are to participate in the group communication session. For example, LTE networks include Multicast-broadcast single-frequency network (MBSFN) broadcast area, which may also be referred to as a multicast service area, which are areas and/or geographic area where LTE multicast bearers are available and/or may be established, for example due to the provisioned network devices in the multicast service area. Furthermore, such multicast service areas may overlap such that a communication device 103 may be present in more than one multicast service area. A communication device 103 that is configured to communicate using LTE may determine one or more multicast service areas (if any) in which it is located (e.g. by communicating with network devices) and communicate identifiers of such one or more multicast service areas to the server 101. Hence, the server 101 may store which multicast service areas, if any, each communication device 103 is located, and the server 101 may further communicate with the BMSC server 105 to set up one or more eMBMS multicast bearers with GBR (or alternatively one or more SC-PTM GBR bearers) for the active communication devices 103 in the group communication; for example, an eMBMS multicast bearer with GBR may be set up for all the active communication devices 103 located in a given multicast service area, for the group communication session.

In particular the server 101 may request, from the BMSC server 105, an eMBMS multicast bearer for a given multicast service area by communicating, to the BMSC server 105, an identifier of the given multicast service area for which an eMBMS multicast bearer is to be established (e.g. without communicating identifiers of the active communication devices 103 in the given multicast service area). Communications between the server 101 and the BMSC server 105 may occur using an MB2C protocol. The BMSC server 105 may respond with a temporary multicast bearer identifier (TMGI), which the server 101 then transmits to the active communication devices 103 in the given multicast service area. The active communication devices 103 receive the TMGI. A transmitting active communication device 103 (e.g. transmitting voice data and/or video when a user "talks" in the group communication session) transmits data (e.g. including, the voice and/or video data) during the group communication session to the server 101; the server 101 transmits the received data, to the BMSC server 105 (e.g. using the MB2U protocol), which causes the data as identified by the TMGI to be broadcast over the air in the given multicast service area (again as identified by the TMGI). Similarly, the active communication devices 103 receiving the TMGI from the server 101 will use the TMGI (e.g. using the LTE chipset) to search for multicast data (e.g. including, voice and/or video) broadcast using the TMGI (e.g. on the group communication session). Hence, an eMBMS multicast bearer may be identified using a TMGI, which is used to facilitate communications over the eMBMS multicast bearer. It is further understood by persons of skill in the art that such eMBMS multicast bearers in LTE are used for downlinks (e.g. receiving data) whereas uplinks (e.g. transmitting data) may occur over a unicast bearer with GBR (or a unicast bearer without GBR). Hence, as understood herein, when an active communication device 103 communicating via an LTE network is using a multicast bearer to communicate in the group communication session, the multicast bearer is for receiving data in the group communication session. However, in other types of networks, such as LMR networks, active communication devices 103 communicating via a multicast bearer both transmit and receive data using the multicast bearer.

Furthermore, the server 101 may communicate with the BMSC server 105 to establish multicast bearers with GBR and/or eMBMS bearers with GBR in at least two modes. In a first example mode, the server 101 may communicate with the BMSC 105 to generate one or more multicast bearers with GBR in multicast service areas a priori, for example by requesting one or more TGMIs from the BMSC server 105 before a group communication session is initiated and/or before any call initiation occurs between the active communication devices 103; hence, in this example mode, the server 101 may store a list of TMGIs that have been pre-established for a given multicast service area. In a second example mode, the server 101 may communicate with the BMSC 105 to generate one or more multicast bearers with GBR after receiving a call initiation request from one or more active communication devices 103 in a multicast service area, which causes the server 101 to request one or more TGMIs from the BMSC server 105 when a group communication session is being established.

When not all the active communication devices 103 are able to communicate in the group communication session using an LTE multicast bearer, the server 101 communicates with the PCRF server 107, for example over a 3rd Generation Partnership Project (3GPP) standard Rx interface, to attempt to establish LTE unicast bearers with GBR for each remaining active communication devices 103 on an associated PLMN, again using their identifiers and optionally their Internet Protocol (IP) addresses and/or a priority of a communication. The PCRF server 107 communicates with suitable network devices to establish such LTE bearers with GBR for the active communications devices 103. However, due to congestion in the network 104-1, and the like, some of the active communication devices 103 may be provided with LTE bearers with GBR, while others may be provided with LTE non-GBR bearers including, but not limited to, an LTE default bearer. In particular, the server 101 may request, from the PCRF server 101, one unicast bearer for a given active communication device 103, over the 3GPP standard Rx interface; for example the server 101 may transmit a respective request for each of the given active communication devices 103 (e.g. one request for each active communication device 103 for which a unicast bearer is being requested). The PCRF server 101 responds to each of the requests with a state of a respective bearer for the given active communication device 103 (e.g. whether a unicast bearer includes a GBR or not and/or is a default bearer). Hence, the PCRF server 107 communicates, to the server 101, for example as a bearer indication, notifications over the 3GPP Rx interface that indicate the success or failure of each respective unicast bearer state (e.g. GBR or no GBR or no bearer established).

The server 101 further communicates with the active communication devices 103 that are not on a PLMN, such as the active communication device 103-N, to instruct them to establish a non-LTE unicast non-GBR bearer to participate in the active communication session.

At a block 404, the controller 220 determines bearer indications for the active communication devices 103, the bearer indications indicating: whether a respective bearer of an active communication device 103 is a unicast bearer or a multicast bearer; and whether the respective bearer has a guaranteed bit rate or no guaranteed bit rate.

For example, as indicated above, one or more of the servers 105, 107 may provide bearer indications to the server 101 which indicate, for example, whether a respective bearer of an active communication device 103 is a unicast bearer or a multicast bearer; and whether the respective bearer has a guaranteed bit rate or no guaranteed bit rate. The server 101 may generally determine that those active communication devices 103 that are not on a PLMN, but rather on a WiFi network and the like (e.g. the network 104-2) are communicating in the group communication session using a non-LTE non-GBR bearer.

In some examples, the bearer indications determined by the controller 220 may comprise a count of respective bearers that are: unicast with a guaranteed bit rate; multicast with a guaranteed bit rate; unicast without a guaranteed bit rate; on one ore more of a non-LTE and a non-PLMN (public-land mobile network) without a guaranteed bit rate. In other words, the controller 220 may count the respective bearers of different types used by the active communication devices 103 to participate in the group communication session.

However, in other examples, the bearer indications determined by the controller 220 may comprise the bearer indications received from the servers 105, 107, and/or the bearer indications specific to the active communications devices 103 that are not on a PLMN network. Hence, for example, the bearer indications determined by the controller 220 may indicate that each of respective bearers of the active communication devices 103 is one of: an LTE (Long-Term Evolution) unicast GBR (Guaranteed Bit Rate) bearer; an LTE multicast GBR bearer; an LTE unicast non-GBR bearer; and a non-LTE unicast non-GBR bearer. For example, the bearer indications determined by the controller 220 may specifically comprise a list of the active communication devices 103 with a respective bearer indication for each of the active communication devices 103.

At a block 406, the controller 220 transmits, using the communication unit 202, to each of the active communication devices 103, the bearer indications to cause each of the active communication devices 103 to provide, at a respective notification device, a notification of the bearer indications. Transmitting, from the server 101 to each of the active communication devices 103, the bearer indications may occur using one or more of: SIP (Session Initiation Protocol) messaging; a SIP SUBSCRIBE/NOTIFY package; HTTP (HyperText Transmission Protocol) messaging; RTP (Real-time Transport Protocol) control blocks; RTCP (RTP Control Protocol) messaging; and/or any other suitable protocol. In specific examples, the server 101 may transmit the bearer indications in SIP call setup messages, adapted to include the bearer indications.

Furthermore, in some examples, the controller 220 may transmit, from the server 101, to the console device 109 for managing the active communication devices 103, the bearer indications to cause the console device 109 to provide, at a console notification device, a respective notification of the bearer indications. Indeed, in some examples, first bearer indications transmitted to the console device 109 include more information about respective bearers of the active communication devices 103, than second bearer indications transmitted to the active communication devices 103. For example, the first bearer indications transmitted to the console device 109 may include the list of the active communication devices 103 with a respective bearer indication for each of the active communication devices 103, while the second bearer indications transmitted to the active communication devices 103 may include the count of each of respective bearers types in the group communication session without an indication of the respective bearer used for each of the active communication devices 103 (e.g. the second bearer indications may comprise: a count of each of respective bearers that are: unicast with a guaranteed bit rate; multicast with a guaranteed bit rate; unicast without a guaranteed bit rate; and on a non-PLMN (public-land mobile network) without a guaranteed bit rate).

In yet further examples, at the block 406, the controller 220 may transmit, to each of the active communication devices 103, an indicator which indicates to each of the active communication devices 103, its own respective bearer type (e.g. see FIG. 6, FIG. 7, FIG. 8 and FIG. 9, described below), which may also be referred to colloquially as a "you-are-here" indication.

At a block 408, the controller 220 determines whether a change has occurred to the respective bearer of one or more of the active communication devices 103. For example, one or more of the active communications devices 103 communicating via the network 104-1 may be moving and drop off of a multicast bearer and/or join a multicast bearer and/or lose a unicast bearer with GBR, for example due to network congestion and/or lose a multicast bearer due to a network event and/or lose a multicast bearer for example due to network congestion. Alternatively, one or more active communications devices 103 may leave or join the group communication session. When such a change occurs, the active communication device 103 and and/or the server 101 and/or suitable network devices may communicate to establish an updated bearer to continue communicating on the group communication session; in these examples, one or more of the servers 105, 107 may report such bearer changes to the server 101 and/or the server 101 may determine that a given active communication device 103 on a multicast bearer has left a multicast service area, and requests a unicast bearer therefore from the server 105, and/or the server 101 may determine such bearer changes for multicast bearers due to pre-emption of multicast resources from a lower priority call in order to grant the resources to a new higher priority call. Alternatively, active communications devices 103 communicating via the network 104-2 may move into an area of coverage for the network 104-1 and communicate with suitable network devices may communicate to establish an updated bearer to continue communicating on the group communication session. Again, one or more of the servers 105, 107 may report such bearer changes to the server 101 and/or server 101 may determine such bearer changes based on mobility events of active communication devices 103. Alternatively, active communications devices 103 may drop off or exit the group communication session.

The server 101 may generally wait to receive such changes (e.g. a "NO" decision is periodically determined at the block 408).

However, when such changes are determined and/or received (e.g. a "YES" decision at the block 408), at a block 410, the controller 220 determines one or more updated bearer indications based on the change to the respective bearer of the one or more of the active communication devices 103, similar to as described above with respect to the block 404.

At a block 412, the controller 220 transmits, from the server 101, to each of the active communication devices 103, the one or more updated bearer indications. Such transmission of the updated bearer indications may occur as described above with respect to the block 412, for example using "in-call" messaging between the server 101 and the active communication devices. Similarly, the controller 220 may transmit, from the server 101, to the console device 109, the one or more updated bearer indications, which may be in a format different from the updated bearer indications transmitted to the active communication devices 103, as described above.

Examples of the method 400 are next described with respect FIG. 5, FIG. 6, FIG. 7, FIG. 8 and FIG. 9.

Figure 5:
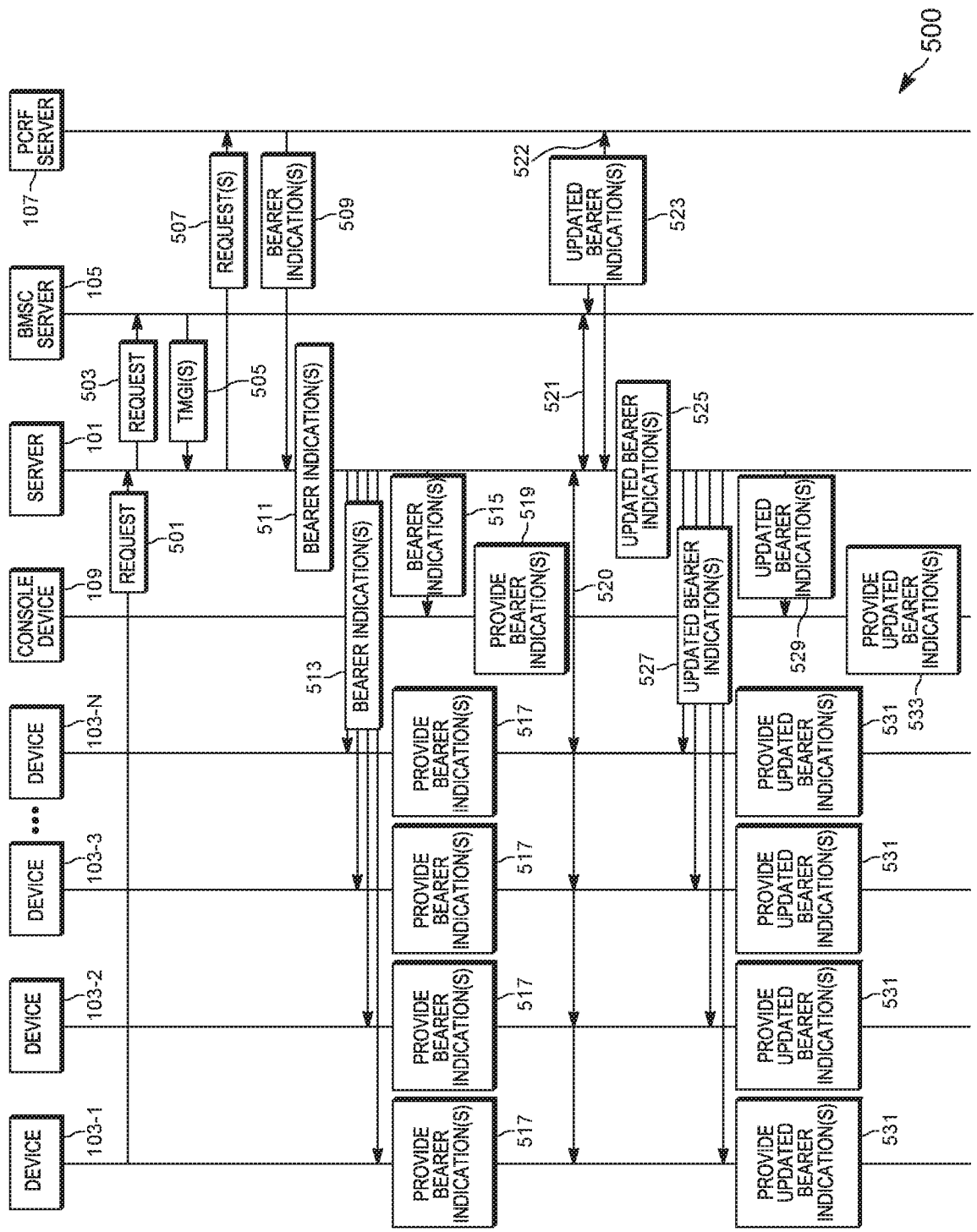
FIG. 5 is a signal diagram showing communication between components of the system of FIG. 1 when implementing a method for determining and providing bearer indications for a group communication session in accordance with some examples.

Attention is next directed to FIG. 5 which depicts a signal diagram 500 showing communication between the components of the system 100.

One or more of the communication devices 103 (as depicted, the communication device 103-1) may initiate an active communication session by transmitting a request 501 to the server 101 to begin a group communication session, for example with a subset of the communication devices 103 identified via a talkgroup identifier and the like in the request 501. While not depicted, a person of skill in the art understands that each of the active communication devices 103 may transmit and/or periodically transmit identifiers of one or more multicast service areas in which an active communication device 103 is located.

The server 101 may determine (e.g. at the block 402 of the method 400) the active communication devices 103 that are to participate in the active communication session via the request 501 and/or a talkgroup identifier in the request 501, and the like. In the example depicted in FIG. 5, all of the depicted communication devices 103 will be described as being active communication devices 103 and/or as participating in the group communication session, though in other examples, fewer than all of the depicted communication devices 103 are active communication devices 103 and/or participate in the group communication session In the depicted example, the server 101 may initiates the active communication session by transmitting a request 503 for a TGMI to the BMSC server 105. The request 503 may include identifiers of the multicast service areas where the active communication devices 103 that are to participate in the active communication session are located, as received at the server 101 from the active communication devices 103. The BMSC server 105 responds with one or more TGMIs 505 to be used by the active communication devices 103 in respective multicast service areas to participate in the group communication session using multicast bearers with GBR (at least for a downlink). The one or more TGMIs 505, along with the identifiers of respective multicast service areas received from the active communication devices 103, enables the server 101 to determine which of the active communication devices 103 are to use multicast bearers with GBR, and hence their respective bearer indications for the group communication session.

While not depicted, a person of skill in the art understands that the request 503 for one or more TGMIs may be transmitted by the server 101 to the BMSC server 105, before the request 501 is received, and hence the one or more TGMIs 505 may be received before the request 501 is received.

When not all the active communication devices 103 are provided with a multicast bearer (e.g. one or more of the active communication devices 103 are not located in a multicast service area), the server 101 may then transmit one or more requests 507 (e.g. one request 507 for each of the active communication devices 103 on the network 104-1 which is not in a multicast service area) for one or more unicast bearers to the PCRF server 107, which communicates with suitable network devices to establish such unicast bearers with or without GBR, and which may depend on network congestion. Each of the requests 507 may hence include a respective identifier of the active communication devices 103 not provided with a multicast bearer. The PCRF server 107 responds with one or more bearer indications 509 (e.g. one bearer indication 509 for each request 507) indicative of the active communication devices 103 that have been provided with a unicast bearer with or without GBR to participate in the group communication session. A person of skill in the art understands that, in some examples, when the server 101 requests a bearer for an active communication device 103 from the PCRF server 107, if the PCRF server 107 responds with a successful indication, a unicast bearer with GBR is granted to the active communication device 103; however, if the PCRF server 107 responds with a failure indication, the default bearer without GBR bearer is granted to the active communication device 103. Hence, the bearer indications 509 may include such indications of success or failure.

While not depicted, the server 101 may also communicate with the active communication device 103-N to establish a unicast bearer without GBR (e.g. on a non-LTE and/or non-PLMN network) to the group communication session via the network 104-2. The server 101 may also communicate with any active communication device 103 on a non-LTE and/or non-PLMN network to establish a unicast bearer without GBR.

The server 101 determines (e.g. at the block 404 of the method 400) bearer indications 511 based on the TGMIs 505 and/or the bearer indications 509 respectively received from the servers 105, 107, as well as communications with the communication devices 103 on non-LTE and/or non-PLMN networks.

The server 101 transmits (e.g. at the block 406 of the method 400) bearer indications 513 to the active communication devices 103 and optionally transmits bearer indications 515 to the console device 109. The bearer indications 513, 515 may be the same or different from each other as described above, and are generally subsets of, and/or the same as, the bearer indications 511 determined by the server 101. Furthermore, the bearer indications 513 may include a respective "you-are-here" indication that indicates, for a given active communication device 103, a bearer type used by the given active communication device 103 in the group communication session (at least for a downlink).

Furthermore, the bearer indications 513 may be transmitted in call set-up messaging used to set up the group communication session, including, but not limited to, a transmission of a TGMI to one or more of the active communication devices 103.

Hence, while not depicted, it is understood that the active communication devices 103 participate in a group communication session via multicast and/or unicast bearers at least upon receipt of the bearer indications 513, however at least a portion of the active communication devices 103 may begin participating in the group communication session prior to receiving the bearer indications 513, for example when the respective bearers are established via the servers 105, 107.

Each of the active communication devices 103 provides 517, at a respective notification device (e.g. the display screen 305 and/or the speaker 328 and/or a haptic notification device and/or any other suitable notification device), a notification of the bearer indications 513, and similarly, the console device 109 provides 519 at a respective notification device, a notification of the bearer indications 515. The notifications are described in further detail below.

During the group communication session, the respective bearers may change, and such changes may be determined by the server 101 and/or one or more of the active communication devices 103 and/or via one or more of the servers 105, 107. For example, communications 520 may generally occur between one or more of the active communication devices 103 and the server 101 during the group communication session and the communications 520 may include changes to a location of an active communication device 103, such as entering or leaving a multicast service area, and the like. Hence, as depicted, communications 521 may occur between the server 101 and the BMSC server 105 to request one or more further TGMIs, as described above, and/or communications 522 may occur between the server 101 and the PCRF server 107 to request further unicast bearers, as described above. The communications 522 may include the PCRF server 107 transmitting updated bearer indications 523 to the server 101. The server 101 may then determine updated bearer indications 525 (e.g. at the block 408 of the method 400) and transmit respective updated bearer indications 527, 529 to the active communication devices 103 and the console device 109 (e.g. an updated count of bearer types and/or an updated list of bearers). However, any suitable process for determining the updated bearer indications 525 is within the scope of present examples. Further, any changes to bearers may occur during the group communication session due to one or more of: active communication devices 103 leaving the group communication session; active communication devices 103 joining the group communication session after the group communication session has been ongoing for a period of time, and the like. Indeed, when active communication devices 103 leave or join the group communication session the updated bearer indications 525 indicate such leaving or joining, for example by decreasing or increasing counts of bearer types, and the like.

Each of the active communication devices 103 provides 531, at a respective notification device (e.g. the display screen 305 and/or the speaker 328 and/or a haptic notification device and/or any other suitable notification device), a notification of the bearer indications 527, and similarly, the console device 109 provides 533 at a respective notification device, a notification of the bearer indications 529.

Figure 6:
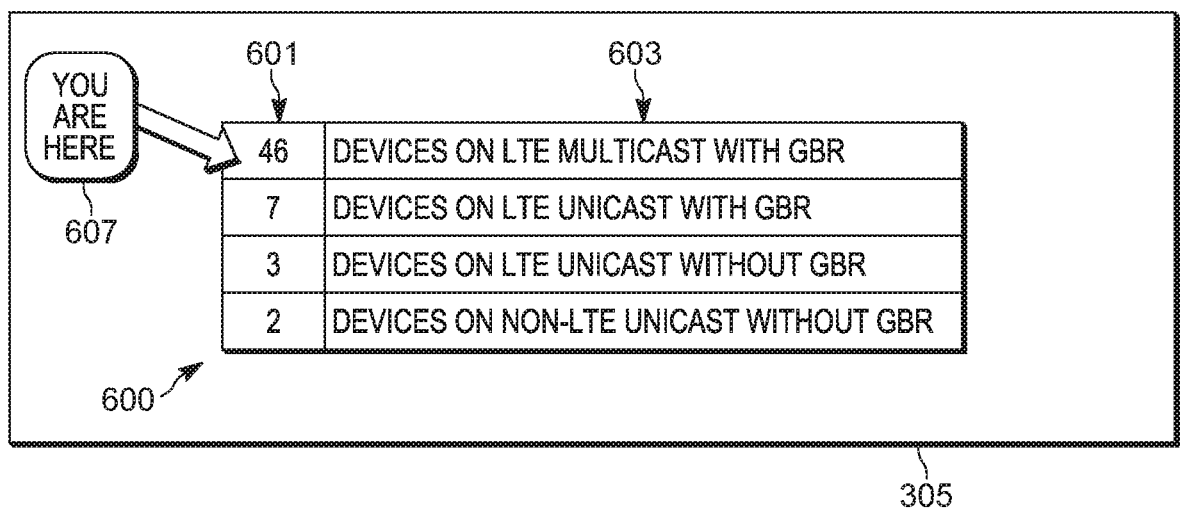
FIG. 6 is a graphic user interface for providing bearer indications for a group communication session in accordance with some examples.
Figure 7:
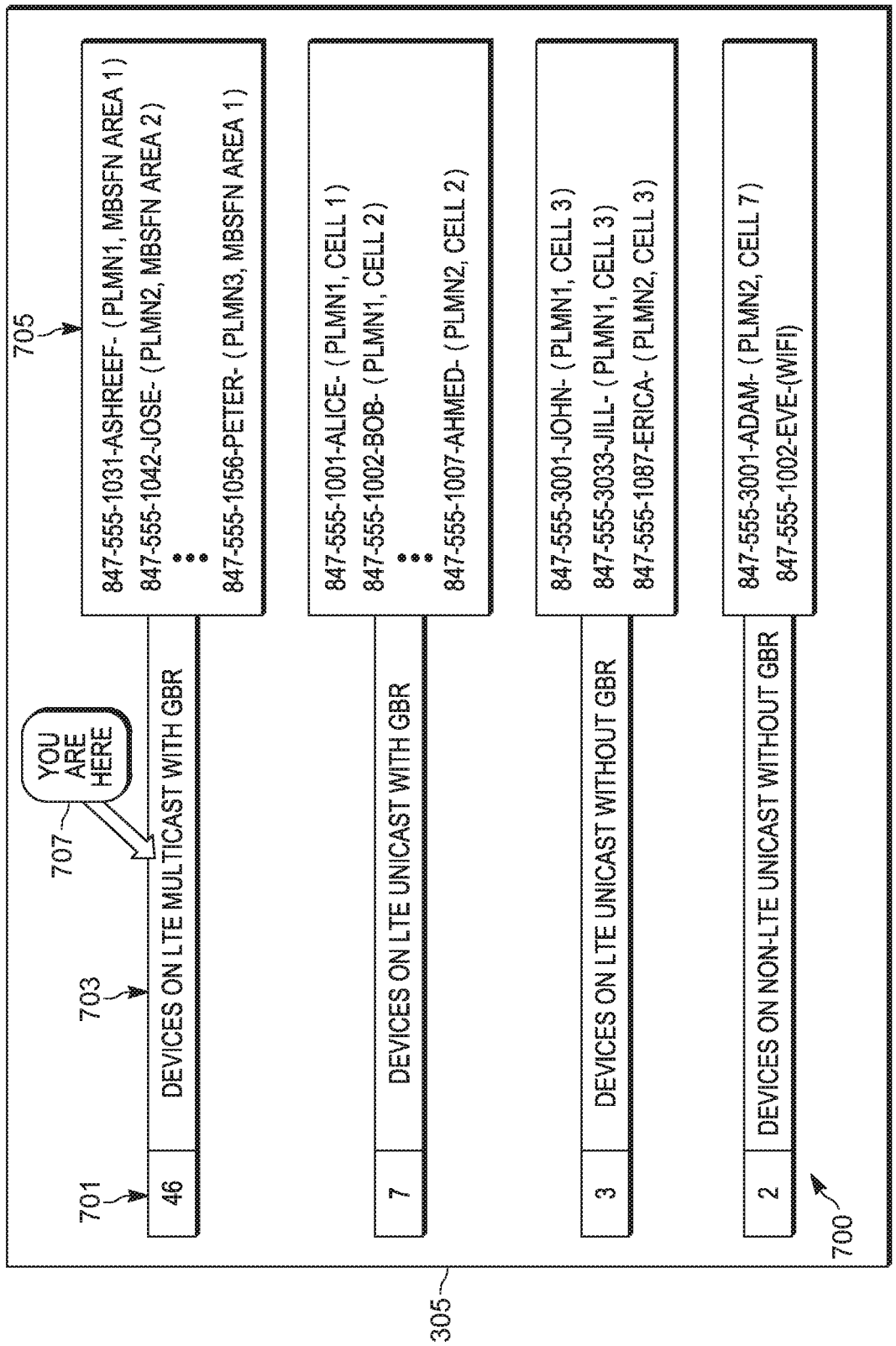
FIG. 7 is a graphic user interface for providing bearer indications for a group communication session in accordance with some alternative examples.

Attention is next directed to FIG. 6 and FIG. 7 which respectively depict example notifications of bearer indications which may be provided at a notification device of an active communication device 103 and/or the console device 109. As depicted, each of the example notifications of the bearer indications of FIG. 6 and FIG. 7 are provided at the display screen 305 of the example communication device 103 of FIG. 3, however, one or more of the example notifications of the bearer indications of FIG. 6 and FIG. 7 may be provided at a display screen of the console device 109. Furthermore, while the example notifications of the bearer indications of FIG. 6 and FIG. 7 are depicted as being provided at the display screen 305, at least a portion of the example notifications may be provided at the speaker 328, for example by converting text of the example notifications and/or the bearer indications to sound using a text-to-speech engine, and the like. Similarly, at least a portion of the example notifications may be provided via vibrations via a haptic device, for example by converting counts of the example notifications to vibrations and/or by providing vibratory indications of changes to the bearers, as described below.

As depicted, each of the example notifications comprise a respective graphic user interface (GUI) 600, 700, each of which include a count 601, 701 of each of the respective bearer types 603, 703 in the group communication session, the count 601, 701 of each of the respective bearer types 603, 703 arranged in rows, with the counts 601, 701 in a first column of each row, and a respective bearer type 603, 703 in a second column of each row. However, any suitable arrangement of the count 601, 701 of each of the respective bearer types 603, 703 is within the scope of present examples.

For example, as depicted, there are "46" active communication devices 103 participating in the group communication session using an LTE multicast bearer with GBR, "7" active communication devices 103 participating in the group communication session using LTE unicasts bearers with GBR, "3" active communication devices 103 participating in the group communication session using an LTE unicast bearer without GBR, and "2" active communication devices 103 participating in the group communication session using non-LTE and/or non-PLMN multicast bearers without GBR.

In the GUI 600 only the counts 601 of the respective bearer types 603 are provided, and hence the GUI 600 may represent an example of the bearer indications 513 provided at the active communication devices 103 as describe above with reference to FIG. 5.

However, the GUI 700 provides more information than the GUI 600. In particular, the GUI 700 provides the counts 701 of the respective bearer types 703 and a list 705 of the active communication devices 103 with a respective bearer indication for each of the active communication devices 103, and hence the GUI 700 may represent an example of the bearer indications 515 provided at the console device 109 as describe above with reference to FIG. 5.

For example, the list 705 comprises, for each of the respective bearer types 703, a respective list showing the phone number (e.g. "847-555-1031"), associated user name (e.g. "Ashreef"), and bearer details (which depend on bearer type) of a respective active communication device 103.

For example, for the devices on LTE multicast bearers with GBR, example bearer details may include a name of a respective PLMN (e.g. "PLMN1", etc., which may include a carrier name) as well as an identifier of a broadcast area of the respective PLMN in which a respective active communication device 103 on the respective multicast LTE multicast bearer with GBR is located (e.g. "MBSFN Area 1").

Similarly, for the devices on LTE unicast bearers with GBR, example bearer details may include a name of a respective PLMN (e.g. "PLMN1", etc., which may include a carrier name) as well as an identifier of a cellular area of the respective PLMN in which a respective active communication device 103 on the respective unicast LTE unicast bearer with GBR is located (e.g. "Cell 1").

Similarly, for the devices on LTE unicast bearers without GBR (such as a default LTE bearer), example bearer details may include a name of a respective PLMN (e.g. "PLMN1", etc., which may include a carrier name) as well as an identifier of a cellular area of the respective PLMN in which a respective active communication device 103 on the respective unicast LTE unicast bearer without GBR is located (e.g. "Cell 1").

Similarly, for the devices on non-LTE and/or non-PLMN unicast bearers without GBR (such as a PLMN without any available GBR for any unicast bearers or WiFi), example bearer details may include a name of a respective PLMN (e.g. "PLMN2", etc., which may include a carrier name) as well as an identifier of a cellular area of the respective PLMN in which a respective active communication device 103 on the respective unicast LTE unicast bearer without GBR is located (e.g. "Cell 7"), or a type of network (e.g. 2G, 3G, WiFi).

Also depicted in each of FIG. 6 and FIG. 7 is a "you-are-here" indication 607, 707 of a bearer type used by a respective active communication device 103. For example, as described above, each of the respective bearer indications 513 transmitted to each of the active communication devices 103 may include an indication of a bearer type used a respective communication device 103. Hence, in the depicted example in each of FIG. 6 and FIG. 7, a person of skill in the art understands that each GUI 600, 700 is being provided by a respective active communication device 103 that is communicating on the group communication session using an LTE multicast bearer with GBR, as each "you-are-here" indication 607, 707 is associated with, and/or is pointing to, the row associated with LTE multicast bearers with GBR. It is further understood that when either of the GUIs 600, 700 is provided by the console device 109, when the console device 109 is not participating in the group communication session, that the "you-are-here" indication 607, 707 are absent.

Hence, the active communication devices 103 and/or the console device 109 provides a notification of the bearer indications of the active communication devices 103 of the group communication session via the GUI 600 and/or the GUI 700.

Figure 8:
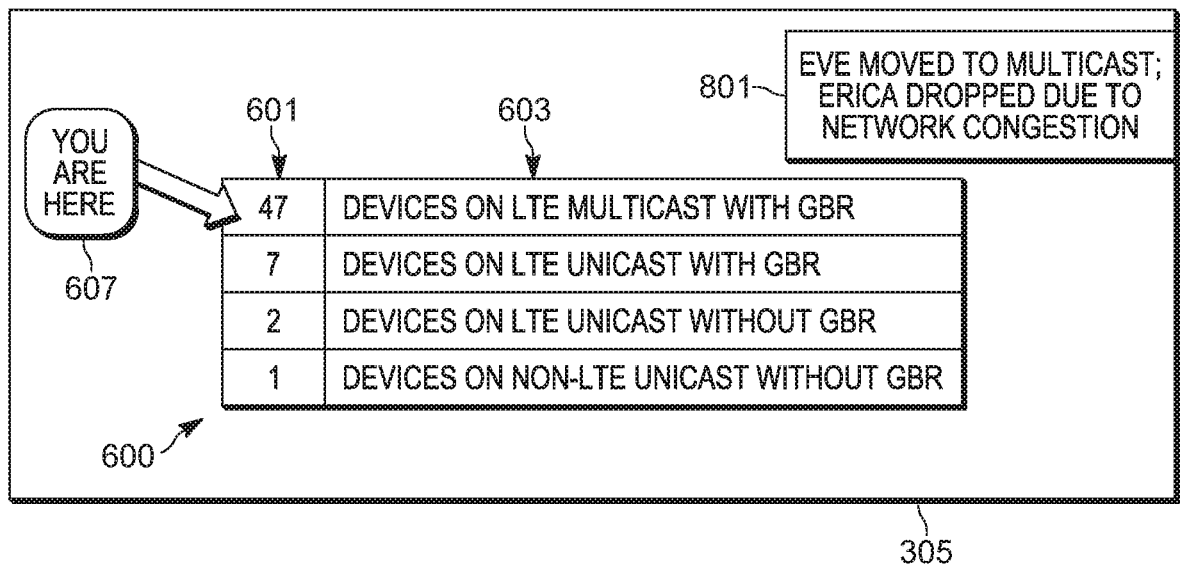
FIG. 8 depicts the graphic user interface of FIG. 6 after updated bearer indications are received in accordance with some examples.
Figure 9:
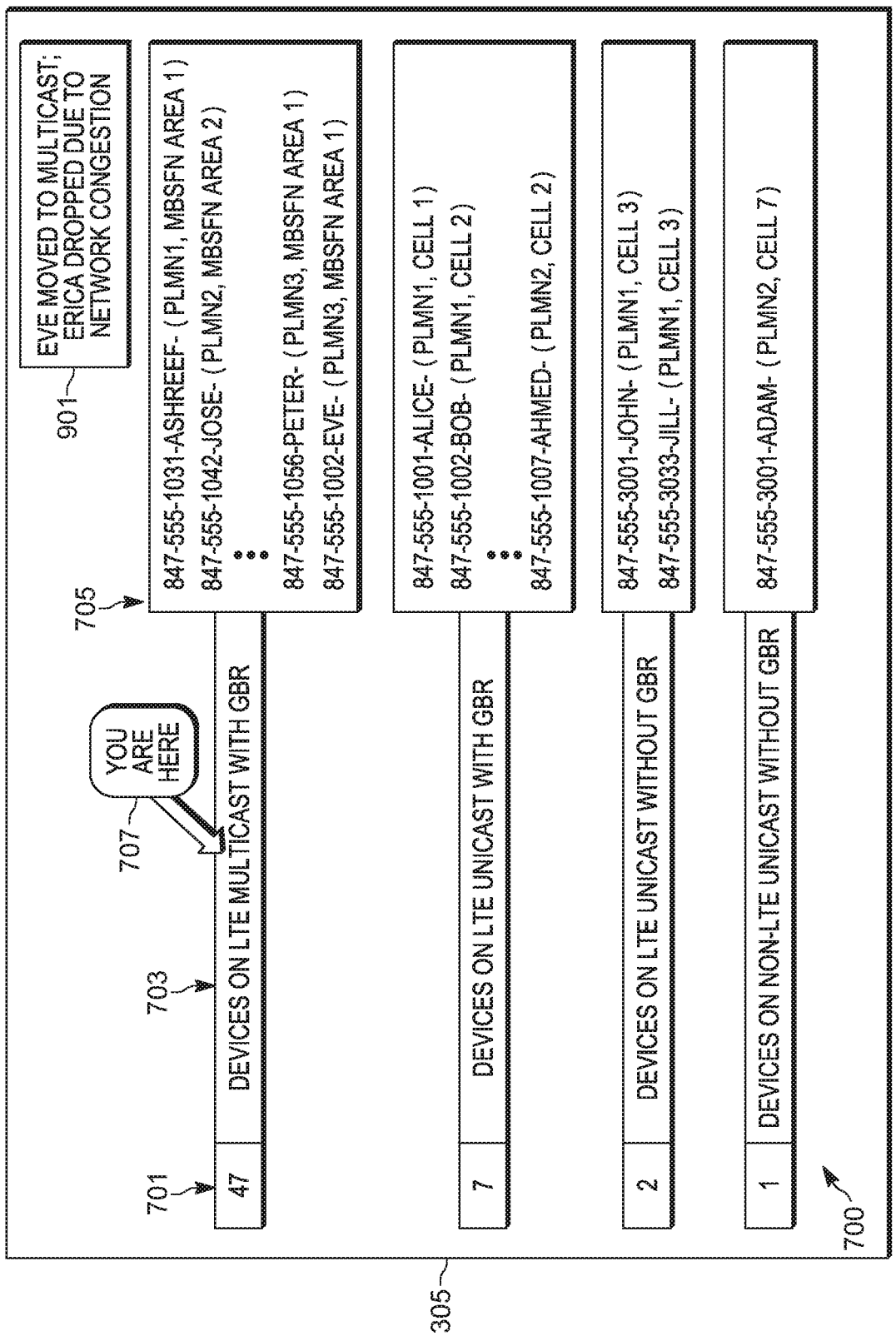
FIG. 9 depicts the graphic user interface of FIG. 7 after updated bearer indications are received in accordance with some alternative examples.

Attention is next directed to FIG. 8 and FIG. 9 which respectively depict the GUI 600 and the GUI 700 after updated bearer indications 527, 529 are received at one or more of the active communication devices 103 and the console device 109.

A person of skill in the art understands that in the depicted example, the active communication device 103 associated with a user "Eve", that had initially been using a WiFi based unicast bearer with no GBR to communicate in the group communication session has moved into an area where an LTE multicast bearer with GBR is available, and hence the active communication device 103 is now communicating in the group communication session using the LTE multicast bearer with GBR. As such, the count of 601, 701 of active communication device 103 on non-LTE unicast bearers without GBR is reduced to "1" and the count of 601, 701 of active communication device 103 on LTE multicast bearers with GBR is increased to "47"; further, the bearer details of the active communication device 103 associated with a user "Eve" are updated in the respective list of the devices on LTE unicast bearers with GBR.

Similarly, a person of skill in the art further understands that in the depicted example, the active communication device 103 associated with a user "Erica" has been dropped from the group communication session for example due to network congestion. As such, the count of 601, 701 of active communication device 103 on LTE unicast bearers without GBR is reduced to "2"; further, the bearer details of the active communication device 103 associated with a user "Erica" are removed from the respective list of the devices on LTE unicast bearers without GBR.

In the depicted example, each of the GUI 600 and the GUI 700 is provided with a respective notification 801, 901 of the changes to the bearers in the group communication session, each of the respective notifications 801, 901 indicating that "Eve" is now on an LTE multicast bearer and "Erica" has been dropped due to network congestion. The information detailing why "Erica" has been dropped may be received from the server 101 in the updated bearer indications 527, 529, for example as determined by the server 101 and/or as received at the server 101 in the updated bearer indications 523. Such notifications 801, 901 may also be provided via the speaker 328.

In yet further examples, an audio notification and/or haptic notification may be provided at the speaker 328 and/or a haptic notification device, for example when an active communication device 103 is dropped from the group communication session (e.g. a sound and/or vibration occurs).

Regardless, users of the active communication devices 103 may be notified when changes occur to the bearers and/or when active communication devices 103 are dropped from the group communication session. Such notifications may cause one or more of the users to initiate another communication with a dropped communication device 103, for example to ensure that critical information is conveyed to the dropped communication device 103 during a security incident, and the like.

Furthermore, the bearer indications and/or changes to the bearers may be stored at a memory associated with the console device 109, and the like, and used for future network planning. For example, the bearer indications and/or changes to the bearers may be archived and analytical algorithms and/or machine learning algorithms, and the like, may be used to analyze the bearer indications and/or changes to the bearers for network planning Provided herein is a device, system and method for determining and providing bearer indications for a group communication session. The bearer indications may be determined on the basis of bearer type and a count of the bearer types may be provided to active communication devices of the group communication session and/or a console device. Alternatively, the bearer indications may comprise a list of the active communication devices of the group communication session and their respective bearer types which may include bearer details, phone numbers, user names, and the like, for each of the active communication devices; the list may be provided to the active communication devices of the group communication session and/or a console device. Regardless, the active communication devices of the group communication session and/or a console device may provide a notification of the bearer indications and may further provide a notification of updated bearer indications, for example when bearers change and/or bearers are dropped. Such bearer indications and/or changes thereto, may be used at the active communication devices to determine when active communication devices are dropped and/or for network planning.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

I claim:

1. A method comprising:
   determining, using a server for managing a group communication session, active communication devices of the group communication session in which one or more of audio and video is exchanged between two or more of the active communication devices;
   determining, at the server, bearer indications for the active communication devices in the group communication session, the bearer indications indicating: whether a respective bearer of an active communication device in the group communication session is a unicast bearer or a multicast bearer; and whether the respective bearer of the active communication device in the group communication session has a guaranteed bit rate or no guaranteed bit rate, wherein the bearer indications comprise a count of each of respective bearers of the active communication devices in the group communication session that are: unicast with a guaranteed bit rate (GBR); multicast with a GBR; unicast without a GBR; and on one or more of a non-LTE (Long-Term Evolution) and non-PLMN (public-land mobile network) without a GBR; and
   transmitting, from the server, to each of the active communication devices in the group communication session, the bearer indications of the active communication devices in the group communication session to cause each of the active communication devices in the group communication session to provide, at a respective notification device, a notification of the bearer indications of the active communication devices in the group communication session.

2. The method of claim 1, wherein the bearer indications indicate that each of respective bearers of the active communication devices is one of:
   an LTE unicast GBR bearer;
   an LTE multicast GBR bearer;
   an LTE unicast non-GBR bearer; and
   a non-LTE unicast non-GBR bearer.

3. The method of claim 2, wherein the LTE multicast GBR bearer comprises an LTE eMBMS (Evolved Multimedia Broadcast Multicast Services) GBR bearer or an LTE SC-PTM (Single-Cell Point-To-Multipoint) GBR bearer.

4. The method of claim 1, wherein the bearer indications further comprise a list of the active communication devices with a respective bearer indication for each of the active communication devices.

5. The method of claim 1, further comprising:
transmitting, from the server to each of the active communication devices, the bearer indications using one or more of:
SIP (Session Initiation Protocol) messaging;
a SIP SUBSCRIBE/NOTIFY package;
HTTP (HyperText Transmission Protocol) messaging;
RTP (Real-time Transport Protocol) control blocks; and
RTCP (RTP Control Protocol) messaging.

6. The method of claim 1, further comprising, when changes occur to one or more respective bearers for the active communication devices:
determining, at the server, one or more updated bearer indications based on the changes to the one or more respective bearers for the active communication devices; and
transmitting, from the server, to each of the active communication devices, the one or more updated bearer indications.

7. The method of claim 1, further comprising:
transmitting, from the server, to a console device for managing the active communication devices, the bearer indications to cause the console device to provide, at a console notification device, a respective notification of the bearer indications, wherein first bearer indications transmitted to the console device include more information about respective bearers of the active communication devices, then second bearer indications transmitted to the active communication devices.

8. The method of claim 7, wherein:
the first bearer indications comprise: the count and a list of the active communication devices with a respective bearer indication for each of the active communication devices; and
the second bearer indications comprise: the count without the list.

9. The method of claim 1, further comprising one or more of:
communicating, at the server, with a BMSC (Broadcast Multicast Service Center) server to establish one or more multicast bearers for the active communication devices in the group communication session; and
communicating with a PCRF (Policy and Charging Rules Function) server to establish one or more unicast bearers for the active communication devices in the group communication session.

10. The method of claim 1, further comprising:
transmitting, to each of the active communication devices, an indicator which indicates to each of the active communications devices, its own respective bearer type, the indicator to cause each of the active communication devices to provide, at the respective notification device, the indicator with the notification of the bearer indications.

11. A server comprising:
a communication unit configured to communicate with active communication devices of a group communication session; and
a controller communicatively coupled to the communication unit,
the controller configured to:
determine the active communication devices of the group communication session in which one or more of audio and video is exchanged between two or more of the active communication devices;
determine bearer indications for the active communication devices in the group communication session, the bearer indications indicating: whether a respective bearer of an active communication device in the group communication session is a unicast bearer or a multicast bearer; and whether the respective bearer of the active communication device in the group communication session has a guaranteed bit rate or no guaranteed bit rate, wherein the bearer indications of the active communication devices in the group communication session comprise a count of each of respective bearers that are: unicast with a guaranteed bit rate (GBR); multicast with a GBR; unicast without a GBR; and on one or more of a non-LTE (Long-Term Evolution) and non-PLMN (public-land mobile network) without a GBR; and
transmit, using the communication unit, to each of the active communication devices in the group communication session, the bearer indications of the active communication devices in the group communication session to cause each of the active communication devices in the group communication session to provide, at a respective notification device, a notification of the bearer indications of the active communication devices in the group communication session.

12. The server of claim 11, wherein the bearer indications indicate that each of respective bearers of the active communication devices is one of:
an LTE unicast GBR bearer;
an LTE multicast GBR bearer;
an LTE unicast non-GBR bearer; and
a non-LTE unicast non-GBR bearer.

13. The server of claim 12, wherein the LTE multicast GBR bearer comprises an LTE eMBMS (Evolved Multimedia Broadcast Multicast Services) GBR bearer or an LTE SC-PTM (Single-Cell Point-To-Multipoint) GBR bearer.

14. The server of claim 11, wherein the bearer indications further comprise a list of the active communication devices with a respective bearer indication for each of the active communication devices.

15. The server of claim 11, wherein the controller is further configured to:
transmit, using the communication unit, to each of the active communication devices, the bearer indications using one or more of:
SIP (Session Initiation Protocol) messaging;
a SIP SUBSCRIBE/NOTIFY package;
HTTP (HyperText Transmission Protocol) messaging;
RTP (Real-time Transport Protocol) control blocks; and
RTCP (RTP Control Protocol) messaging.

16. The server of claim 11, wherein the controller is further configured to, when changes occur to one or more respective bearers for the active communication devices:
determine one or more updated bearer indications based on the changes to the one or more respective bearers for the active communication devices; and
transmit, using the communication unit, to each of the active communication devices, the one or more updated bearer indications.

17. The server of claim 11, wherein the controller is further configured to:
transmit, using the communication unit, to a console device for managing the active communication devices, the bearer indications to cause the console device to provide, at a console notification device, a respective notification of the bearer indications, wherein first bearer indications transmitted to the console device include more information about respective bearers of the active communication devices, then second bearer indications transmitted to the active communication devices.

18. The server of claim 17, wherein:
the first bearer indications comprise: the count and a list of the active communication devices with a respective bearer indication for each of the active communication devices; and
the second bearer indications comprise: the count without the list.

19. The server of claim 11, wherein the controller is further configured to one or more of:
communicate, using the communication unit, with a BMSC (Broadcast Multicast Service Center) server to establish one or more multicast bearers for the active communication devices in the group communication session; and
communicate, using the communication unit, with a PCRF (Policy and Charging Rules Function) server to establish one or more unicast bearers for the active communication devices in the group communication session.

20. The server of claim 11, wherein the controller is further configured to:
transmit, to each of the active communication devices, an indicator which indicates to each of the active communications devices, its own respective bearer type, the indicator to cause each of the active communication devices to provide, at the respective notification device, the indicator with the notification of the bearer indications.

* * * * *